March 11, 1930. C. F. M. VAN BERKEL 1,750,071
SLICING MACHINE
Filed June 20, 1927   2 Sheets-Sheet 1

Inventor
Cornelis F. M. van Berkel
By Nissen & Crane
attys.

March 11, 1930.    C. F. M. VAN BERKEL    1,750,071
SLICING MACHINE
Filed June 20, 1927    2 Sheets-Sheet 2
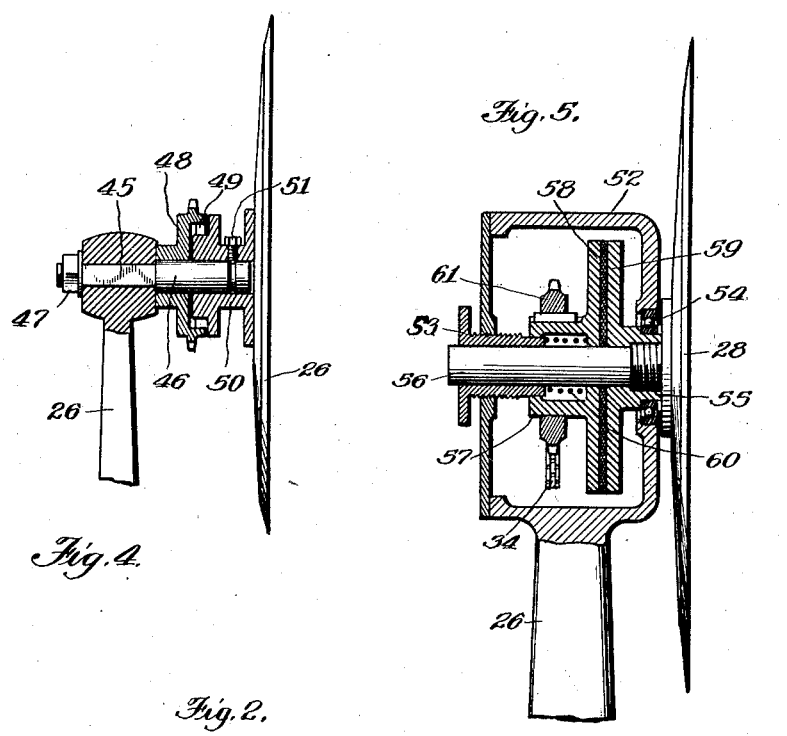
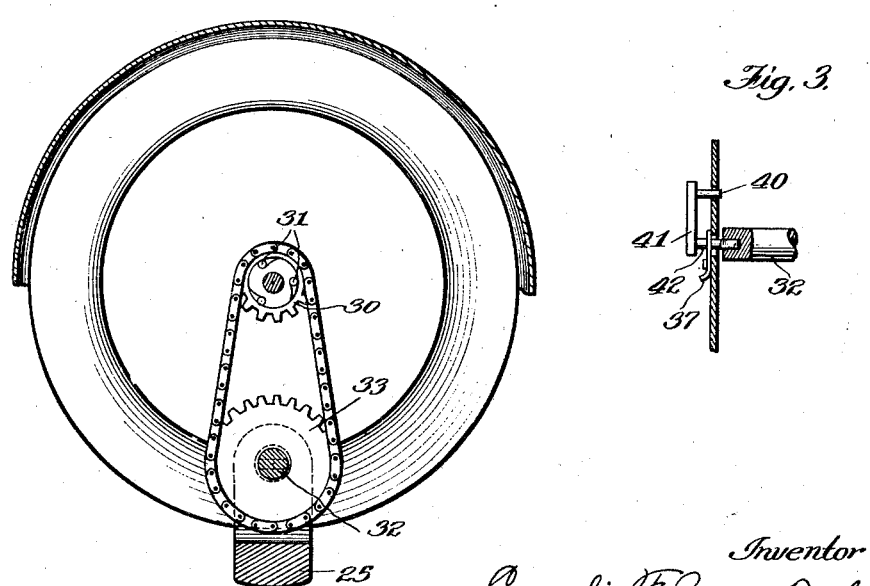
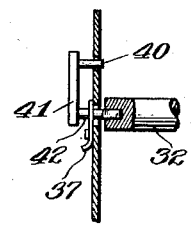
Inventor
Cornelis F. M. van Berkel
By Nissen & Crane
Attys.

Patented Mar. 11, 1930

1,750,071

UNITED STATES PATENT OFFICE

CORNELIS FRANCISCUS MARIA VAN BERKEL, OF WASSENAAR, NETHERLANDS, ASSIGNOR TO U. S. SLICING MACHINE COMPANY, OF LA PORTE, INDIANA, A CORPORATION OF INDIANA

SLICING MACHINE

Application filed June 20, 1927, Serial No. 200,244, and in the Netherlands August 25, 1926.

This invention relates to machines for slicing meat and other material and is especially adapted for slicing meat having bones, such as pork chops.

One object of the invention is to provide a slicing machine which will sever both the meat and bone.

Other objects will appear from the following description.

The invention is exemplified in the combination and arrangement of parts shown in the accompanying drawings and described in the following specification, and it is more particularly pointed out in the appended claims.

In the drawings—

Fig. 2 is a section substantially on line 2—2 of Fig. 1;

Fig. 3 is a fragmentary sectional view showing a detail;

Fig. 4 is an elevation, with parts in section, of a modified knife support; and

Fig. 5 is a view similar to Fig. 4 showing another modification.

Figure 1:
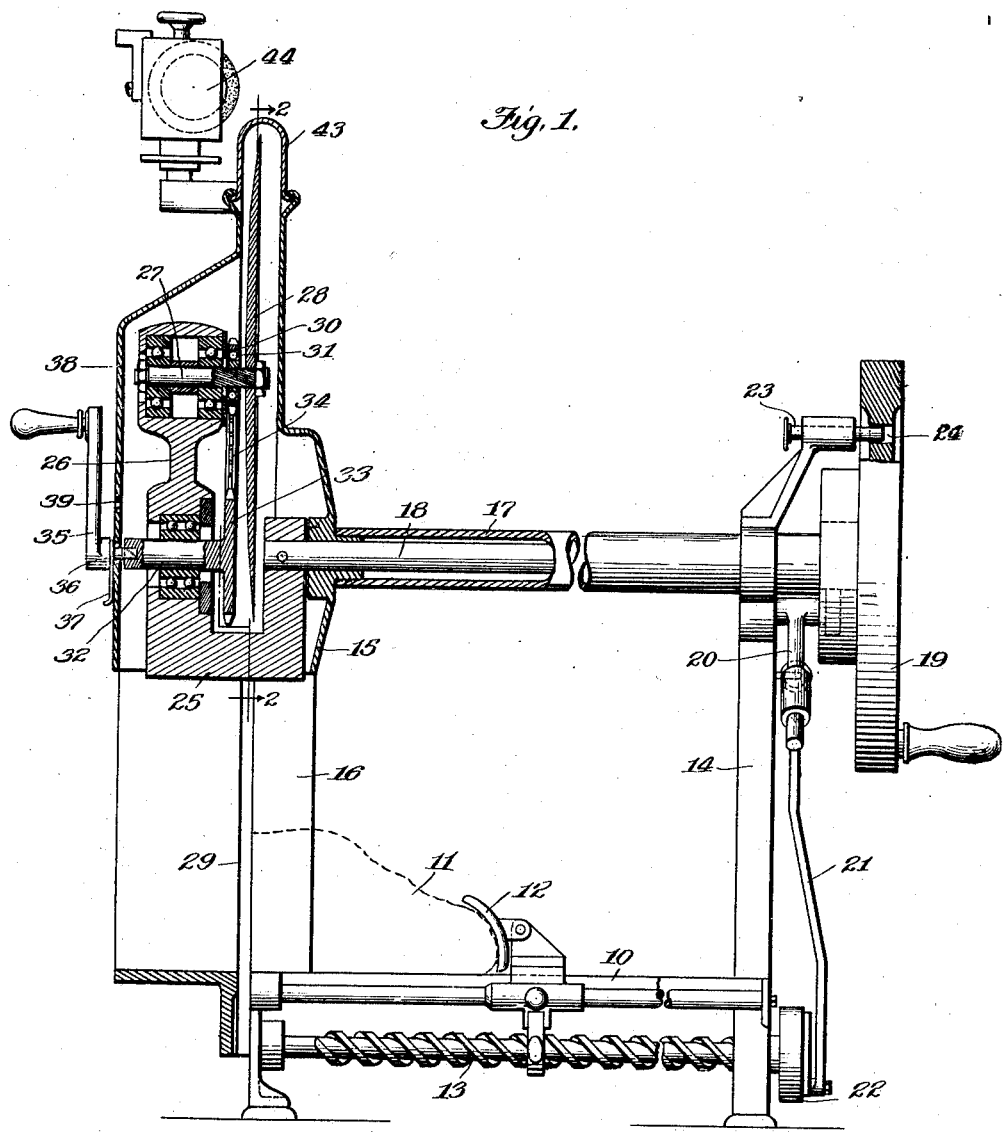
Fig. 1 is a side elevation, with parts in section, showing one embodiment of the present invention.

Slicing machines as heretofore constructed having positively driven rotary circular knives are not well adapted for slicing meat containing bone for the reason that the bone offers a great deal of resistance to the rotary movement of the knife and thus interferes with the cutting operation of the knife. Applicant has discovered that a disc knife is, however, admirably adapted for cutting bone if the knife is left practically free to assume its own angular position upon its own axis while forced through the material into the bone. The action of the knife is similar to that of a cleaver which chops the bone rather than that of a butcher knife drawn in the direction of the edge of the knife across the bone. The present invention provides means for rotating the knife about its own axis for severing meat or other material, but is arranged for cutting bone without the rotary movement of the knife upon its own axis. The invention also provides means for rotating the knife upon its own axis while the axis is held stationary for the purpose of grinding or cleaning the knife.

The slicing machine, as shown in Fig. 1 of the drawings, comprises a slideway 10 upon which the meat or other material 11 is supported and along which it is slid by a follower 12 operated by a feed screw 13. At one end of the slideway 10 is an upright frame 14 and at the opposite end of the slideway 10 is a housing 15 having an opening 16 therethrough for the passage of material to be sliced. The frame 14 and housing 15 are connected by a pipe or tubular casing 17 through which the main drive shaft 18 extends, the drive shaft being journaled in the frame 14 and the housing 15. The shaft 18 is rotated by a hand wheel 19 which operates a lever 20 connected by a link 21 with a oneway drive 22 by means of which the feed screw 13 is intermittently rotated. The hand wheel 19 and shaft 18 may be locked against rotation by a pin 23 arranged to enter an opening 24 in the wheel 19. The shaft 18 carries at its forward end a U-shaped yoke and counterweight 25 which supports an arm 26 having a spindle 27 journaled therein. A rotary disc slicing knife 28 is fixed to the spindle 27 and is disposed in alinement with a slot 29 at the front side of the casing 16 through which the knife passes when the shaft 18 is rotated to swing the arm 26 about the axis of the shaft. A sprocket wheel 30 is mounted on the spindle 27 and is connected therewith by a one-way drive comprising roller clutch members 31. The one-way drive permits rotation of the sprocket 30 in one direction upon the spindle 27 but prevents relative rotation of the sprocket wheel and spindle in the opposite direction. A stud shaft 32 is journaled in the arm 26 in axial alinement with the shaft 18 and carries a sprocket wheel 33 in the plane of the sprocket 30. A chain 34 connects the sprocket wheels 30 and 33. A hand crank 35 is provided with a squared stud 36 arranged to engage a squared socket in the end of the shaft 32. A sliding spring catch 37 detachably holds the hand crank 35 in place.

The casing 15 is provided with a front plate 38 which encloses the upper portion of the path of the slicing knife 28 and crank arm 26. The plate 38 is provided with a perforation 39 for receiving a pin 40 on a locking clip 41 shown in Fig. 3. The clip 41 carries a stud 42 having a squared end for entering the squared opening in the shaft 32. The stud 42 may be held in place by the spring catch 37. It will be apparent that the clip 41 when in position as shown in Fig. 3 will hold the shaft 32 against rotation.

When the machine is used for slicing meat with bones, such as pork chops, both the handle 35 and the clip 41 are removed so that the stud shaft 32 is free to rotate. This will leave the spindle 27 and the knife 28 also free to rotate about the axis of the spindle 27. The pin 23 is withdrawn to permit rotation of the hand wheel 19 and as the hand wheel is rotated the arm 26 will be rotated about the axis of the shaft 18 to swing the slicing knife past the opening 16, causing it to engage the material 11, cutting through both the meat and bone. When the knife strikes the bone it will be free to rotate upon its own axis so that there is no necessity for movement of the knife through the bone in the direction of the edge of the knife. This cutting action has been found very effective in slicing meat with bones, and especially for slicing chops. When it is desired to use the machine for slicing material without bones, the clip 41 may be placed in position as shown in Fig. 3, which will hold the sprocket 33 stationary and will impart rotation to the knife 18 about its own axis when the shaft 18 is rotated. When it is desired to sharpen or clean the knife the hand wheel 19 is locked by the pin 23 with the arm 26 extending upwardly.

The upper portion of the housing 15 is provided with a removable cap 43. When this cap is removed the top portion of the knife will be exposed and may be engaged by a grinder or wiping device 44. To grind the knife the hand crank 35 is placed in position as shown in Fig. 1, and rotation of the hand crank will drive the knife 28 to rotate about the axis of the spindle 27. The one-way drive 31 permits rotation of the knife 28 by the hand crank 35 in one direction only, thus insuring rotation of the knife in proper direction for grinding.

In the modification shown in Fig. 4, the crank arm 26 is provided with a squared opening in its outer end for receiving a squared portion 45 of a stud shaft 46. The stud shaft 46 is held in place by a nut 47. A sprocket wheel 48 is journaled on the shaft 46 and is connected by a one-way drive 49 with a sleeve 50 also journaled on the shaft 46 and held against longitudinal movement thereon by a set screw 51. The knife 28 is fixed to the sleeve 50. The operation of the knife shown in Fig. 4 will be similar to that in Fig. 1.

In the form of the invention shown in Fig. 5, the crank arm 26 is provided with a housing 52 having a bearing sleeve 53 threaded in one side of the housing and a bearing 54 mounted in the opposite side of the housing. A sleeve 55 is journaled in the bearing 54 and is fixed to a shaft 56 to which the knife 28 is secured. The shaft 56 is also journaled in the bearing 53. A second sleeve 57 surrounds the shaft 56 and is provided with a face plate 58 which co-operates with a face plate 59 secured to the sleeve 55. The plates 58 and 59 have their engaging faces covered with friction material to provide frictional driving contact between the two faces. A spring 60 is housed within the sleeve 57 and bears against the end of the bearing sleeve 53 and the plate 58 to resiliently press the plates 58 and 59 into contact with each other. The pressure of the spring 60 may be regulated by rotating the bearing sleeve 53 to screw the sleeve toward and from the spring 60. A sprocket wheel 61 is splined on the sleeve 57 for co-operation with the sprocket chain 34. For operating this form of device the clip 41 is used to hold the shaft 32 and sprocket 33 against rotation so that the knife 28 is rotated upon its own axis at the same time that it is swung about the axis of the shaft 18. When the knife enters a piece of meat having bone imbedded therein the knife will continue to rotate upon its own axis to slice the meat until the edge of the knife strikes the bone. The friction drive between the plates 58 and 59 will then permit the knife to remain stationary upon its own axis while it is forced through the bone. When the knife leaves the bone the resistance to rotation upon its own axis will be removed so that the remaining portion of the meat will be sliced by the combined rotation of the knife upon its own axis and forward movement about the axis of the shaft 18. This construction is especially useful where heavier pieces of meat having bone imbedded in them are to be sliced, because it permits the movement of the knife best adapted for slicing meat during the greater part of the meat slicing operation and at the same time permits chopping action without producing a draw cut for severing the bone. The pressure between the plates 58 and 59 may be regulated to produce the amount of friction best adapted for the particular material being sliced. The bearing sleeve 53 may be tightened to prevent relative rotation of the knife and shaft when desired. This facilitates grinding the knife when considerable resistance to rotation is encountered.

I claim:—

1. A meat and bone cutting machine comprising a rotary disc slicing knife, means for revolving said knife eccentrically to the axis of the knife to cause said knife to engage material to be sliced, said knife being free to assume its own angular position relative to its own axis during the movement of said knife through the material to be sliced.

2. A meat and and bone cutting machine comprising a rotary shaft, an arm projecting from said shaft, a knife journaled on said arm at a point eccentric to said shaft, and means for rotating said shaft to move the axis of said knife about the axis of said shaft, said knife being free to remain stationary as relates to rotation upon its own axis during a slicing operation thereby, said knife also being free to assume its own angular position relative to its own axis, during the movement of said knife through the material to be sliced.

3. A meat and bone cutting machine comprising a rotary drive shaft, a radially extending arm connected with said drive shaft, a disc knife journaled on said arm at a point spaced from the axis of said drive shaft, means for rotating said drive shaft to swing said knife about the axis of said drive shaft to cause said knife to engage material to be sliced, and means for rotating said knife upon its own axis during the rotation of said knife about the axis of said drive shaft, said last-named means being arranged to be rendered inoperative to permit said knife to remain stationary relative to its own axis or to assume its own angular position on its own axis under the force exerted thereon by the material being sliced.

4. A meat and bone cutting machine comprising a rotary drive shaft having a radially extending arm secured thereto, a knife journaled on said arm for rotation about its axis eccentric to the axis of said drive shaft, a driving member co-axial with said drive shaft, a chain connecting said member with said knife for rotating said knife upon its own axis when said knife is revolved about the axis of said drive shaft, means for holding said driving member stationary, and means for rotating said driving member independently of said drive shaft, said holding means and said rotating means both being detachable from said driving member to leave said driving member free to assume its own position of rotation.

5. A meat and bone cutting machine comprising a disc knife, a yielding friction drive for rotating said knife upon its own axis, and means for moving said knife transverse to the axis thereof into engagement with material to be sliced.

6. A meat and bone cutting machine comprising a disc knife, means for moving said knife bodily into engagement with material to be sliced, and means for rotating said knife upon its own axis, said rotating means comprising a yielding driving connection to permit said knife to yield to resistance offered to rotation thereof upon its own axis.

7. A meat and bone cutting machine comprising a drive shaft having a radially extending arm, a disc knife journaled to rotate upon said drive shaft, means for rotating said drive shaft to move the axis of said knife about the axis of said drive shaft for causing said knife to engage material to be sliced, and means for rotating said knife upon its own axis during the rotation of said knife about the axis of said drive shaft, said last-named means comprising a frictional driving connection to permit said knife to yield to resistance to rotation thereof upon its own axis offered by the material being sliced.

8. A meat and bone cutting machine comprising a drive shaft having a radially extending arm thereon, a knife journaled on said arm eccentric to said drive shaft, means for supporting material to be sliced in the path of movement of said knife about the axis of said drive shaft, and a driving connection for rotating said knife about its own axis when said drive shaft is rotated, said driving connection including an adjustable yielding frictional drive to permit said knife to remain stationary as regards rotation thereof upon its own axis when it encounters resistance to such rotation.

9. A slicing machine comprising a circular disc knife pivoted to rotate around its axis, and means for continuously revolving said knife about an axis eccentric to its axis to move said knife bodily through material to be sliced, said knife being free to remain stationary upon its own axis, or to rotate upon its own axis under the force exerted thereon by the material to be sliced during slicing operations.

10. A meat and bone cutting machine comprising an arm, means for rotating said arm, a rotary disc knife carried by said arm, a driving element carried by said arm spaced from said knife and rotatable about the axis of rotation of said arm, a driving connection between said driving element and said knife, and a clutch in said driving connection.

11. A meat and bone cutting machine comprising an arm, means for rotating said arm, a stud shaft having a sprocket thereon journaled in said arm, a knife rotatably mounted on said arm, a clutch connected with said knife, and a driving chain between said sprocket and clutch.

12. A slicing machine comprising in combination, an arm, means for rotating said arm, a gear element carried by said arm and rotatable about the axis of rotation of said arm, a rotary knife carried by said arm, a driving connection between said knife and gear element, and a detachable member for rotating said gear element.

13. A slicing machine comprising in combination, an arm, means for rotating said arm, a gear element carried by said arm and rotatable about the axis of rotation of said arm, a rotary knife carried by said arm, a driving connection between said knife and gear element, a detachable member for rotating said gear element, and means for locking said gear element against rotation.

14. A slicing machine comprising in combination, an arm, means for rotating said arm, a sprocket carried by said arm and rotatable about the axis of rotation of said arm, a rotary knife carried by said arm, a driving chain between said sprocket and knife, and a detachable member for rotating said sprocket.

15. A slicing machine comprising in combination, an arm, means for rotating said arm, a sprocket carried by said arm and rotatable about the axis of rotation of said arm, a rotary knife carried by said arm, a driving chain between said sprocket and knife, a detachable member for rotating said sprocket, and means for locking said sprocket against rotation.

In testimony whereof I have signed my name to this specification on this 18th day of May, A. D. 1927.

CORNELIS FRANCISCUS MARIA van BERKEL.